No. 660,911. Patented Oct. 30, 1900.
B. G. LAMME.
ALTERNATING CURRENT INDUCTION MOTOR.
(Application filed Apr. 14, 1900.)
(No Model.)
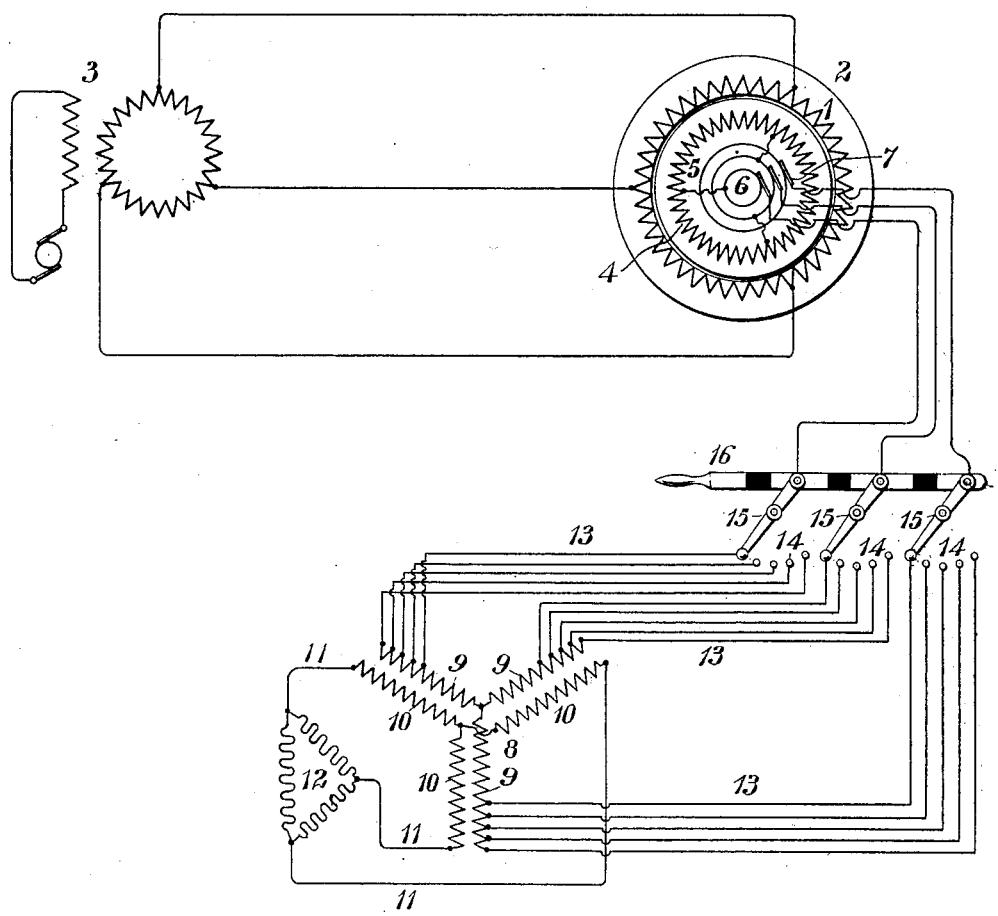
WITNESSES:
C. L. Belcher
Birney Hines
INVENTOR
Benjamin G. Lamme
BY
Wesley G. Carr
ATTORNEY.

United States Patent Office.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

ALTERNATING-CURRENT INDUCTION-MOTOR.

SPECIFICATION forming part of Letters Patent No. 660,911, dated October 30, 1900.

Application filed April 14, 1900. Serial No. 12,923. (No model.)

*To all whom it may concern:*

Be it known that I, BENJAMIN GARVER LAMME, a citizen of the United States, residing at Pittsburg, in the county of Allegheny and State of Pennsylvania, have invented a new and useful Improvement in Alternating-Current Induction-Motors, of which the following is a specification.

My invention relates to alternating-current motors of the type known as "induction-motors," in which the primary member only is connected with the power-circuit, the current in the windings of the secondary member being generated therein by induction.

The object of my invention is to provide an efficient and reliable means for producing a constant torque with variable speed in motors of the character above indicated, and to this end I have devised the means illustrated in the accompanying drawing and hereinafter described.

The single figure of the drawing is a diagram of a three-phase generator and a three-phase motor provided with my improvement.

Referring to the drawing in detail, the primary member 1 of a three-phase motor 2 is supplied with operating energy from a three-phase generator 3. The secondary member 4 of the motor 2 is here shown as the rotating member and as having its winding 5 connected at equidistant points to suitable collector-rings 6, with which brushes 7 engage. The primary and secondary windings of the motor may have any form and arrangement which have been or may be found suitable in practice and may be adapted for a different number of phases of current than that indicated, the illustration being diagrammatic and intended to merely illustrate any suitable windings for motors of this general character.

It has been proposed prior to my invention to secure an approximately constant torque with variable speed in induction-motors by a variation in the watts of the secondary member obtained by varying the resistance of the circuits of the secondary member of the motor as the speed varies. In lieu of this means I propose to vary the watts in circuits of the secondary member, and consequently the slip of the motor, by varying the current of an inductively-related circuit that contains an invariable resistance.

In order to vary the watts in the circuits of the secondary member of the motor, and thereby maintain a substantially constant torque with variations in speed, I provide a transformer 8, the primary windings 9 of which have a three-phase star connection, and the secondaries 10 of which are arranged and connected in the same manner. The outer terminals of the secondary windings 10 are connected by means of conductors 11 to equidistant points in a suitable resistance-conductor 12, which constitutes the load on the transformer. This resistance may obviously be made variable, if desired; but in general it may be so selected as to have an invariable value for any particular machine, since the variations in the watts whereby the slip of the motor is varied are secured by other means. In order to secure this variation in watts, I connect a series of points in each section 9 of the primary winding of the transformer to a suitable switching device, whereby the active length of the primary winding may be varied in accordance with the motor speed desired. As shown in the drawing, the leads 13 from the several points in the primary winding 9 of the transformer are connected to stationary contact-terminals 14, with which switch-arms 15 may be made to successively engage by means of a suitable operating-arm 16. Any other suitable switching device, operated either by hand or automatically, may obviously be employed, the device shown being intended merely as illustrative of any operative means for varying the length of the transformer primary, which is included in circuit with the windings of the secondary member of the motor. The primary winding 9 of the transformer 8 is of such low resistance that variations of its length for the purpose of varying the electromotive force of the circuit will not materially change the ohmic resistance of such circuit.

Since the current in the circuit of the secondary member of the motor is substantially constant for any given torque, a variation in the number of ampere-turns of the primary winding of the transformer will correspondingly vary the number of ampere-turns of the secondary winding, and since the number of turns of the secondary winding of the transformer is not varied the amperes must vary, and this variation in amperes must vary the watts, since the resistance is constant. This variation in the watts produces a variation in the slip of the motor, and consequently a variation in speed. An increase in the ampere-turns will effect an increase in the slip of the motor and a corresponding decrease of speed, and, conversely, a decrease in the ampere-turns will reduce the slip of the motor and correspondingly increase its speed, the torque remaining at all times substantially constant. The means hereinbefore described for varying the speed of an induction-motor and maintaining a constant torque is advantageous, since it permits of a comparatively high-voltage circuit for the secondary member of the motor and a low-voltage circuit for the resistance, thus enabling me to employ a comparatively inexpensive form of resistance-body and one that is efficient and durable in use. It would of course be feasible to vary the length of the secondary of the transformer 8 instead of varying the length of the primary, and I therefore desire it to be understood that my invention is broad enough to cover either of these operations. It will be also understood that the apparatus may be otherwise modified from what is shown without departing from the spirit and scope of my invention.

I claim as my invention—

1. The combination with an alternating-current induction-motor, of a transformer having a loaded secondary, means for connecting the transformer primary in circuit with the secondary winding of the motor and means for varying the active length of said transformer primary to provide a constant torque with variable speed of the motor.

2. The combination with an induction-motor, of a transformer having a primary winding of variable length, means for varying the active length of said winding, circuit connections between said winding and the secondary winding of the motor, and a secondary winding for said transformer that is closed upon itself through a comparatively high resistance.

3. The combination with an alternating-current induction-motor, of a transformer having one of its windings in circuit with the secondary winding of the motor, an ohmic resistance in series with the other transformer-winding and means for varying the number of active turns in one of said transformer-windings.

4. The combination with an alternating-current induction-motor, of a transformer having one of its windings in series with the winding of the secondary member of the motor, an ohmic resistance-body in series with the other transformer-winding and means for varying the number of active turns in one of the transformer-windings and thereby varying the number of ampere-turns in both windings.

5. The combination with an alternating-current induction-motor, of a transformer having its primary winding in series with the winding of the secondary member of the motor, means for varying the number of active turns in said primary winding and an ohmic resistance-body connected in series with the secondary winding of said transformer.

In testimony whereof I have hereunto subscribed my name this 12th day of April, 1900.

BENJ. G. LAMME.

Witnesses:
C. L. BELCHER,
BIRNEY HINES.